United States Patent Office.

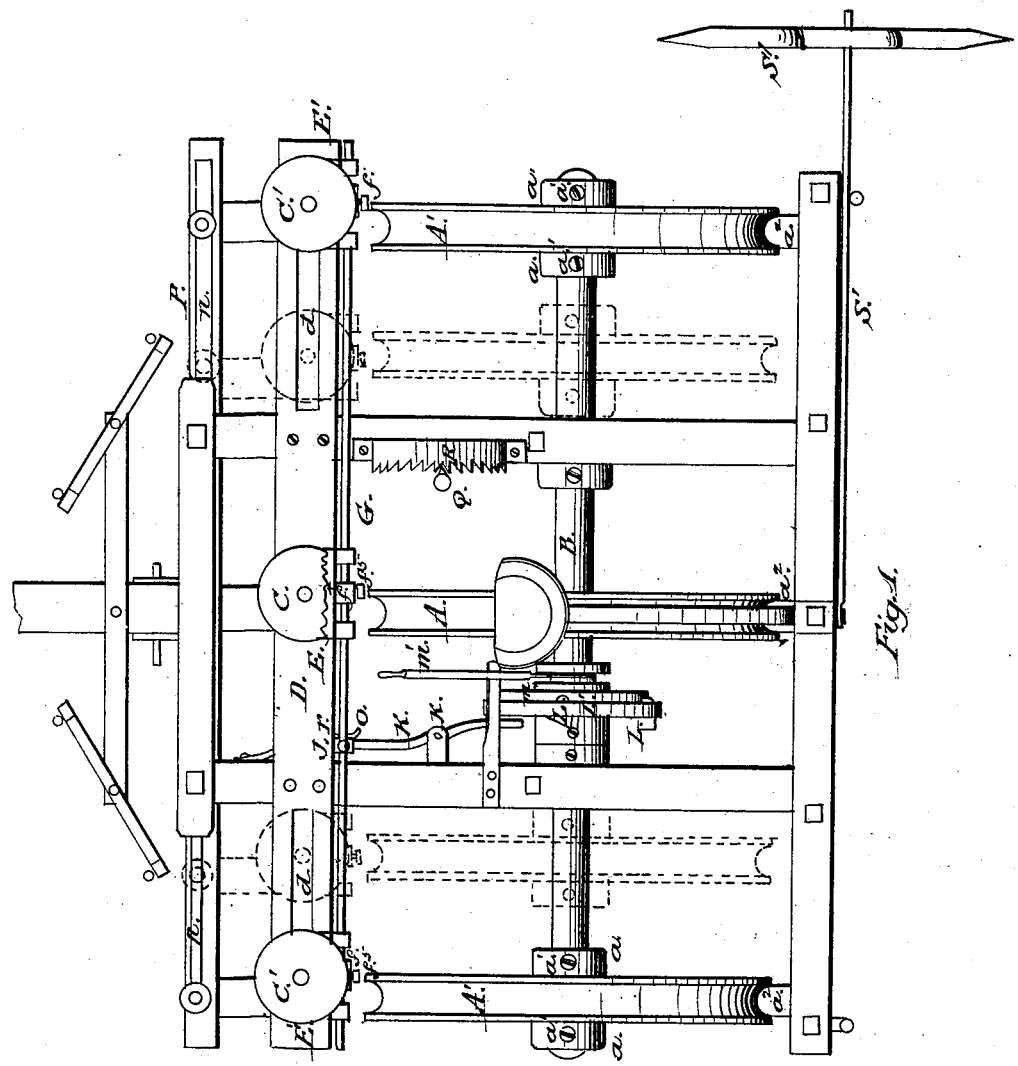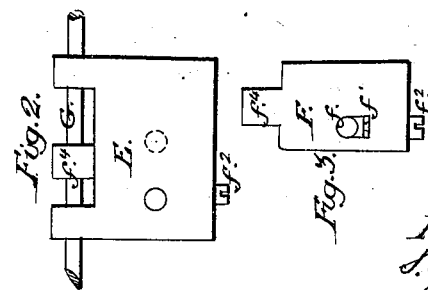

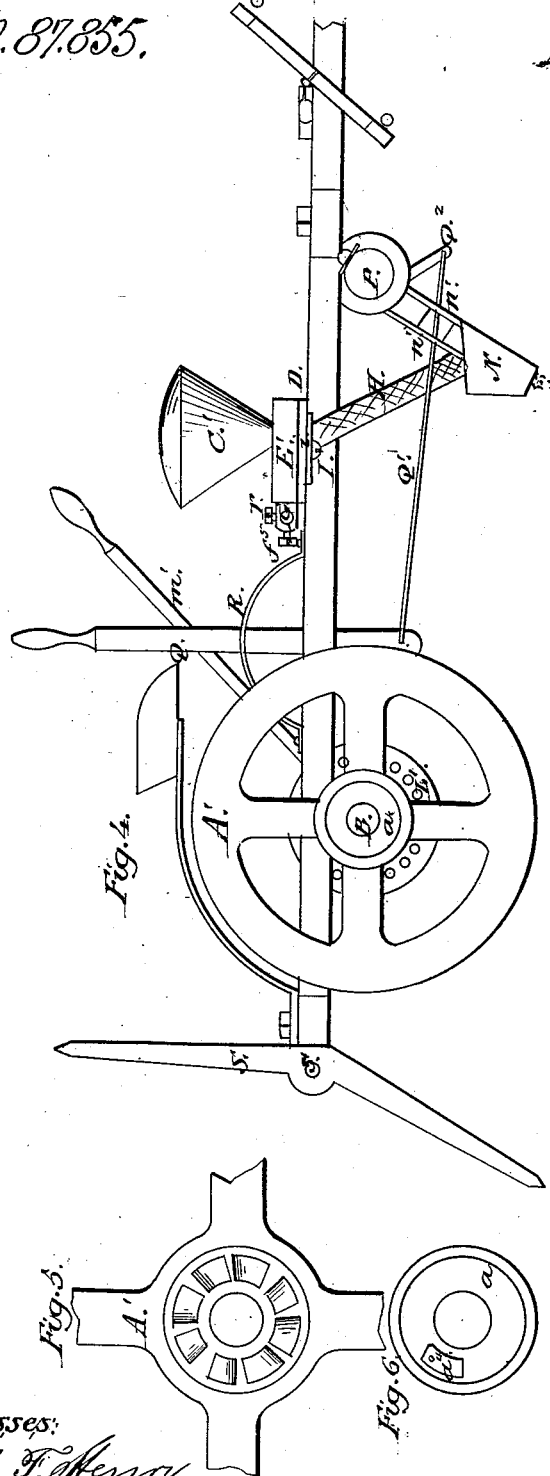

STEPHEN S. KIMBALL, OF LACONIA, NEW HAMPSHIRE, ASSIGNOR TO HIMSELF AND J. F. PRESCOTT, OF SAME PLACE.

Letters Patent No. 87,855, dated March 16, 1869.

IMPROVEMENT IN PLANTER AND SEEDING-MACHINE.

The Schedule referred to in these Letters Patent and making part of the same.

*To all whom it may concern:*

Be it known that I, STEPHEN S. KIMBALL, of Laconia, in the county of Belknap, and State of New Hampshire, have invented certain new and useful Improvements in Corn-Planting and Seeding Machines; and I do hereby declare the following to be a full, clear, and exact description of the same, reference being had to the accompanying drawings, which are made part of this specification, and of which—

Figure 1 is a plan of a machine embodying my improvements.

Figures 2, 3, 5, and 6, exhibit parts detached, and will be hereinafter more particularly referred to.

Figure 4 is a side view of the machine.

Similar letters of reference indicate corresponding parts in the several figures.

In this machine, the wheels, hoppers, slides, conducting-tubes, and furrow-opening shovels, are made capable of lateral adjustment, in order that the machine may be adapted for planting the seed in rows, at any desired distance asunder.

The shovels, or plows, are attached by springs, or elastic shanks, to a rock-shaft, which affords a ready means of raising and lowering the shovels, and changing their operating-position.

Provision is made for varying the capacity of the seed-cells of the slides, and a novel device is employed for actuating the lever, whereby the seed-slides are reciprocated.

In order that others skilled in the art to which my invention appertains, may be enabled to fully understand and use the same, I will proceed to describe it in connection with the annexed drawing.

A A' A' represent three wheels, mounted upon an axle-tree, B, which supports the main frame of the machine. The wheels are respectively situated directly behind the hoppers, and may have peripheral grooves, to adapt them to cover the seed, over which they pass immediately after it is dropped.

The middle wheel, A, may be keyed, or otherwise fixed in a permanent position upon the axle-tree, but the outer wheels, A' A', may be moved to any desired position upon the axle B, and held in place by means of the collars $a$ $a$, which, when made fast to the axle at opposite sides of the wheels A' A', by means of set-screws $a^1$ $a^1$, hold the wheel against lateral movement thereon.

Scrapers, $a^2$ $a^2$ $a^2$, may be applied to the main frame, so as to project into the grooves of the wheels, and free them of earth.

D is a bed-plate, secured to and extending across the forward part of the main frame, and supporting the hoppers C C' C', which correspond in number and position with the wheels A A' A'.

The hoppers are attached to boxes, E E' E', (see fig. 2,) in which the seed-slides have a reciprocating movement, to drop the seed in regulated quantities, at appropriate intervals. One of the seed-slides is shown at F, fig. 3.

Each slide has a cell, or pocket, $f$, one side of which is part of a movable block, $f^1$, which can be moved to and held in any desired position, by means of a set-screw, $f^2$, for the purpose of determining or varying the capacity of the cell, and thus regulating the quantity deposited at every movement of the seed-slide.

A lug, or socket, $f^4$, is formed on each seed-slide, to enable the slide to be attached to a rod, G, by means of a set-screw, $f^5$.

It will be understood that the slides F are held to the rod G at points to suit the positions of their respective hoppers and boxes, and the slides can be adjusted upon the rod as often as the position of said boxes and hoppers may be changed.

The conducting-tubes H are fitted upon short necks, or tubes, projecting downward from the under side of the boxes E E' E'. The boxes are provided with ears, which serve as guides for the rod G, which plays freely through the same.

The plate D has longitudinal slots, $d$ $d$, which admit of the adjustment of the outer hoppers, C' C', together with their boxes and conducting-tubes, so that they, as well as the wheels A' A', may be placed nearer to or further from each other, according to the degree of separation of the rows planted by the machine at each passage over the field.

Set-screws, or screw-bolts, I, passing through the slots $d$, into the boxes E', and operating in connection with washers, $i$, serve to hold the boxes, hoppers, and tubes in place, when adjusted.

During the operation of the machine, the motion of the seed-slides in one direction places their cells directly beneath the openings in the bottom of the hoppers from which they are filled. The motion of the slides in the opposite direction, places the cells directly over the openings in the bottom of the boxes, through which the contents of the cells are delivered into the tubes, which conduct the grain, or seed, to the earth.

J, fig. 1, is an arm, fitted to slide upon the rod G, and held in any desired position thereon, by a set-screw, $r$.

The arm J is acted upon by a vibrating lever, K, working upon a vertical pivot at $k$, and actuated by wedge-shaped blocks, L, attached to a disk, L', the latter being formed with an annular flange, or collar, and fitted therewith upon the axle B.

The disk L' derives rotary motion from the axle, and the action of the wedge-shaped blocks upon the lever, and the consequent action of the lever upon the arm J, impart a reciprocating movement to the rod G and seed-slides, the arm J and rod G having a return-movement given them by a spring, O, as often as they are impelled by the wedges of the disk.

A circular series of perforations is formed in the disk L', as shown in fig. 4, to adapt the wedges to be held in different positions by screws, or screw-bolts, and enabling the number of wedges to be readily increased or diminished, to suit the intervals at which the seed-slides are to be actuated.

$m$ is a clutch, fitted to slide upon a splined portion of the axle B, and moved by means of a lever, $m'$.

The juxtaposition of the clutch with the disk L', causes the latter to rotate with the axle, but in order to arrest the motion of the disk L' and of the seed-slides, it is only necessary to slide the clutch away from the disk.

The shovels, or furrow-openers, N, are attached, by their shanks, to a shaft, P, which is slotted, as shown at $n\ n$, to admit of the lateral adjustment of the shovels, to adapt them to conform to the position of the other members of the machine.

The shaft P is supported in bearings, in which it may be turned axially, by means of a lever, Q, and connections, $Q^1\ Q^2$, for the purpose of turning the plows to their operating, or elevated position, the lever Q being detained by engagement with the teeth of a segment, R, so as to hold the shaft P, and the shovels, in the intended position.

The shovel-shanks are partially constituted by springs $n'\ n'$, which render them capable of yielding to over-riding obstacles without injury.

The naves of the adjustable wheels A' may have indentations, as shown in fig. 5, to adapt them to be coupled with their respective collars $a$, by means of a locking-spring, or detent, $a^4$, which is applied to the faces of the collars, in the manner shown in fig. 6. By thus coupling the wheels with the collars, the former, as well as the latter, are compelled to turn with the axle.

The bar S, which is attached to the pivoted rod S', marks the ground at the side of the machine, at every trip, and the mark so made forms a guide for every succeeding trip, enabling the driver to properly direct the course of the machine.

The rod S', being attached by a pivot to the rear end of the machine, the marker may be shifted from one side to the other.

Having thus described my invention,

What I claim as new, and desire to secure by Letters Patent, is—

1. The adjustable wheels A' A' and adjustable hoppers C C', when combined and operating substantially as described.

2. The adjustable wheels A' A', adjustable hoppers C' C', and adjustable slides F, combined and operating substantially as described.

3. The slides F, attached to and made capable of adjustment upon the rod G, in the manner and for the purpose set forth.

4. The disks L', having a circular series of holes, for the wedge-blocks L, in order to increase or decrease their number on said disk, for the purpose set forth.

5. The combination and arrangement of the disk L', blocks L, clutch $m$, levers K and $m'$, arm J, spring O, rod G, and seed-slides F, as described and represented.

6. The slotted rock-shaft P, having the shanks of the shovels, or furrow-openers, adjustably attached thereto, as and for the purpose set forth.

7. The springs $n'\ n'$, in combination with the shovels, or furrow-openers N, and rock-shaft P, as and for the object set forth.

The above signed by me, this 10th day of December, 1868.

STEPHEN S. KIMBALL.

Witnesses:
 JOHN A. WIEDERSHEIM,
 PHIL. F. LARNER.